United States Patent
Cosyns et al.

(10) Patent No.: US 8,771,501 B2
(45) Date of Patent: Jul. 8, 2014

(54) ELIMINATION OF CHLORINE COMPOUNDS FROM HYDROCARBON CUTS

(75) Inventors: Jean Cosyns, Maule (FR); Olivier Ducreux, Louveciennes (FR); Quentin Debuisschert, Rueil Malmaison (FR); Fabienne Le Peltier, Rueil Malmaison (FR)

(73) Assignee: IFP Energies Nouvelles, Rueil-Malmaison Cedex (FR)

(*) Notice: Subject to any disclaimer, the term of this patent is extended or adjusted under 35 U.S.C. 154(b) by 755 days.

(21) Appl. No.: 12/989,278

(22) PCT Filed: Mar. 27, 2009

(86) PCT No.: PCT/FR2009/000337
§ 371 (c)(1),
(2), (4) Date: Oct. 22, 2010

(87) PCT Pub. No.: WO2009/133260
PCT Pub. Date: Nov. 5, 2009

(65) Prior Publication Data
US 2011/0040136 A1    Feb. 17, 2011

(30) Foreign Application Priority Data
Apr. 25, 2008 (FR) ...................................... 08 02345

(51) Int. Cl.
*C10G 45/04* (2006.01)
*C10G 69/08* (2006.01)

(52) U.S. Cl.
CPC ................ *C10G 45/04* (2013.01); *C10G 69/08* (2013.01)
USPC ......................................... 208/262.1; 208/99

(58) Field of Classification Search
USPC .................................................. 208/99, 262.1
See application file for complete search history.

(56) References Cited

U.S. PATENT DOCUMENTS

| 3,658,690 A * | 4/1972 | Graven ........................... 208/62 |
| 4,639,259 A | 1/1987 | Pearson |
| 5,505,926 A | 4/1996 | Lee et al. |

(Continued)

FOREIGN PATENT DOCUMENTS

| EP | 0948995 A1 | 10/1999 |
| EP | 1053053 A | 11/2000 |

OTHER PUBLICATIONS

World IP Organization. "International Search Report and Written Opinion." PCT/FR2009/000337, Examiner: Julien Hart, Applicant: IFP, Mailed Sep. 3, 2009.

(Continued)

*Primary Examiner* — Randy Boyer
*Assistant Examiner* — Brandi M Doyle
(74) *Attorney, Agent, or Firm* — Millen, White, Zelano & Branigan, P.C.

(57) ABSTRACT

The invention concerns a process for purification by elimination of chlorine in the form of hydrogen chloride and organochlorine compounds by contacting in the presence of hydrogen of at least a part of the effluent from a reforming, aromatics production, dehydrogenation, isomerisation or hydrogenation zone, said part of the effluent comprising olefins, hydrogen chloride and organochlorine compounds, on an elimination zone comprising a chain arrangement of two masses, the first mass being a mass comprising at least one metal from group VIII deposited on a mineral carrier and the second mass being a hydrogen chloride adsorbent.

13 Claims, 1 Drawing Sheet

(56) References Cited

U.S. PATENT DOCUMENTS

| | | | |
|---|---|---|---|
| 6,409,910 B1 * | 6/2002 | Nedez .............................. | 208/99 |
| 6,551,566 B1 | 4/2003 | Grover et al. | |
| 2004/0192983 A1 * | 9/2004 | Bergmeister et al. ......... | 585/259 |
| 2005/0256351 A1 * | 11/2005 | Birke et al. ..................... | 585/10 |
| 2007/0116620 A1 | 5/2007 | Kanazirev et al. | |

OTHER PUBLICATIONS

Espacenet Database: "English Abstract—Process for removing halogenated compounds from a gas or liquid with at least one metallic element-containing composition." EP0948995, Applicant: IFP, Oct. 13, 1999.

\* cited by examiner

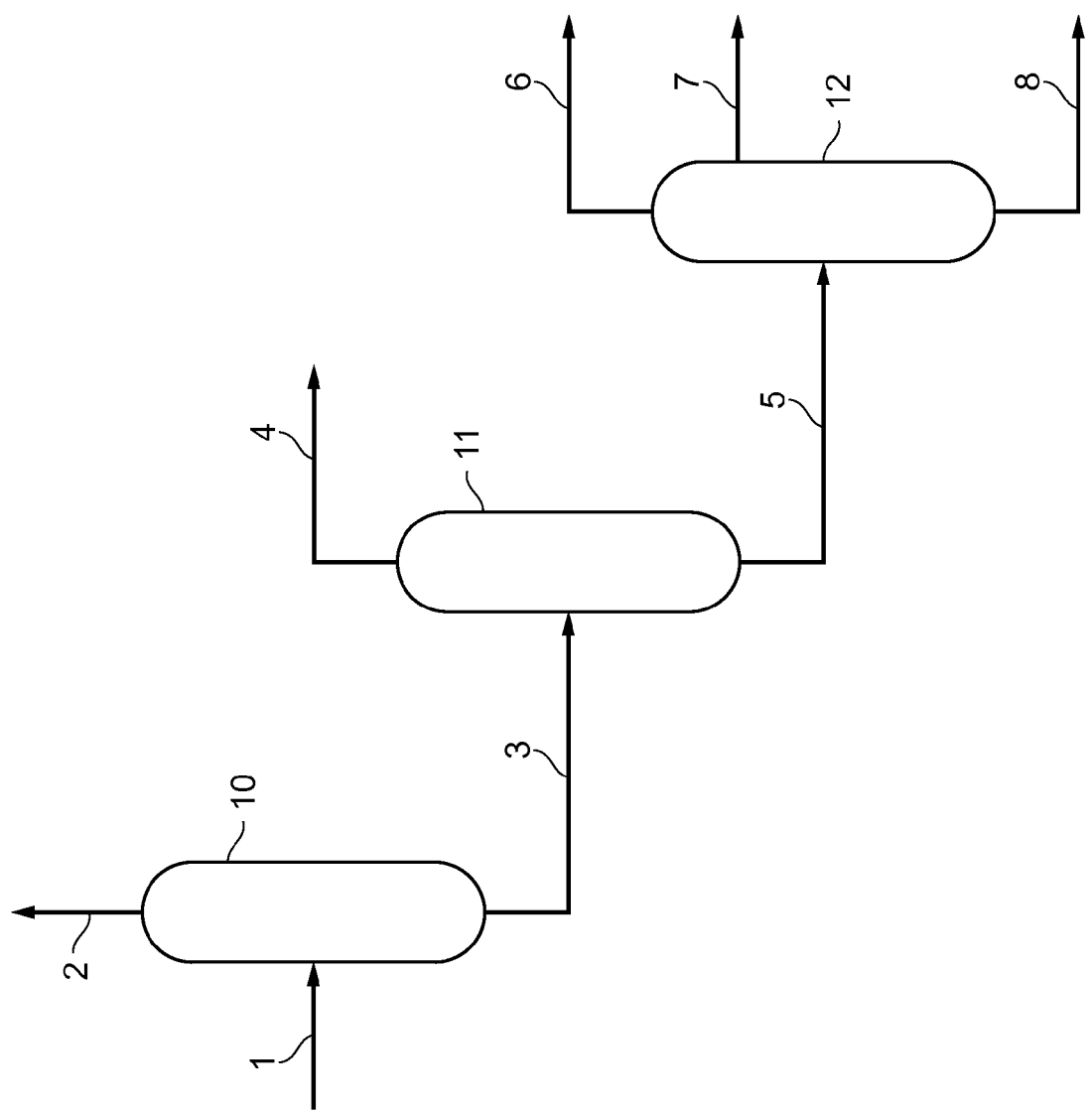

ELIMINATION OF CHLORINE COMPOUNDS FROM HYDROCARBON CUTS

The present invention relates to a process for purification by elimination of chlorine in the form of hydrogen chloride and organochlorine compounds.

We are going to illustrate the present invention in the case of a process for purification by elimination of chlorine on a part of an effluent from a reforming zone.

One of the aims of catalytic reforming is to obtain hydrocarbons having an increased octane number. It is established that the octane number of a hydrocarbon is higher in proportion to an increasing degree to which it is branched, cyclic and indeed aromatic. In that way cyclisation and aromatisation reactions for the hydrocarbons will be promoted.

Usually such hydrocarbon cyclisation and aromatisation reactions take place in the presence of chlorinated bimetallic heterogeneous catalysts. Those chlorinated catalysts are alumina-based and most frequently comprise platinum and another metal such as for example tin, rhenium or iridium. The presence of chlorine in such catalysts is important as, added to the alumina, it ensures overall acidity for the system and participates in redispersion of the platinum in the course of time, thus making it possible to stabilise the catalytic activity of the catalyst.

The addition of chlorine however is not a solution without its disadvantages. In fact, with the passage of time, it is found that there is elution of the chlorine, in particular in the form of hydrogen chloride. Such elution is manifested firstly by the constant necessity to replenish the catalyst with chlorine. It also leads to the presence of hydrogen chloride and other chlorine compounds in the gaseous and liquid effluents issuing from the catalytic reforming operation, which can result in a problem in terms of corrosion of the installation, a problem regarding the formation of deposits or salts based on chlorine or a problem in regard to accelerated contamination of the catalysts disposed downstream, for example benzene hydrogenation catalysts.

Catalytic reforming also produces hydrogen. In refining petroleum hydrogen is a particularly precious product, in particular by virtue of its use in hydrotreatments which are being increasingly developed with the aim of improving environmental protection.

As the discharge from traditional catalytic reforming which operates under a pressure of about 2 MPa or indeed above, the gaseous effluents are for the major part composed of hydrogen, light hydrocarbons such as methane, ethane . . . , and in general have traces of hydrogen chloride and water. It is therefore important to be able to remove all traces of hydrogen chloride from such effluents, for example on alumina-based solids, and then recycle and therefore use the purified hydrogen, still in a refinery situation.

Moreover, regenerative or regeneration processes have recently been devised and are being increasingly developed on the ground. Those processes operate under a pressure of close to 0.3 to 1.5 MPa, or even less.

As the discharge from a regenerative catalytic reforming operation, in addition to hydrogen, light hydrocarbons, traces of hydrogen chloride and water, traces of unsaturated hydrocarbons such as ethylene, propylene, butenes, butadiene . . . have been detected. Those unsaturated hydrocarbons, in the presence of chlorine and in contact with adsorbent, are at least partially transformed into organochlorine compounds which are precursors of oligomers of high molecular masses. Those 'green oils' can give rise to blockages in the installation. Hence, a significant reduction in the service life of the adsorbent is found: in certain cases a reduction of 4 to 5 times has been observed.

That phenomenon is also observed in relation to alumina-based solids dedicated to the removal of chlorine in liquid effluents from catalytic reforming which do not entirely eliminate the organochlorine compounds present and in addition can result in the formation of organochlorine compounds in the presence of monoolefins/diolefins and hydrogen chloride.

The aim of the present invention is to propose an improved process for effective elimination of chlorine compounds and hydrogen chloride, more particularly, contained in a gas or a liquid. Another aim of the present invention is to propose a process employing a composition which will substantially reduce or indeed suppress the formation of oligomers and in particular chlorinated oligomers referred to as 'green oils', downstream of the regenerative or regeneration reforming processes.

An attraction of the present invention is that suppression of the chlorine compounds makes it possible in particular to avoid the harmful formation of $NH_4Cl$ and corrosion problems linked to the chlorine.

Another attraction of the present invention is that the suppression of the chlorine compounds makes it possible to protect the catalysts of the downstream units, in particular the catalyst of the benzene hydrogenation unit.

PRIOR ART

Patent application EP 1053053 describes a process for eliminating, reducing and/or suppressing halogen compounds contained in a gas or a liquid, wherein the gas or the liquid is brought into contact with a composition obtained by deposit on an alumina of at least one compound comprising at least one element selected from alkali metals, followed after the deposit operation by calcination of the alumina at a temperature of at least 600° C.

Patent application EP 0948995 describes a process for eliminating the halogen compounds contained in a gas or a liquid wherein the gas or the liquid is brought into contact with a composition comprising an alumina and/or a hydrated alumina and at least one metallic element selected from the group formed by the metals of groups VIII, IB and/or IIB.

SUMMARY OF THE INVENTION

The invention concerns a process for purification by elimination of chlorine in the form of hydrogen chloride and organochlorine compounds by contacting in the presence of hydrogen of at least a part of the effluent from a reforming, aromatics production, dehydrogenation, isomerisation or hydrogenation zone, said part of the effluent comprising olefins, hydrogen chloride and organochlorine compounds, on an elimination zone comprising a chain arrangement of two masses, the first mass being a mass comprising at least one metal from group VIII deposited on a mineral carrier and the second mass being a hydrogen chloride adsorbent.

DETAILED DESCRIPTION OF THE INVENTION

In the text group VIII corresponds to group VIII in accordance with the classification CAS corresponds to the metals of columns 8 to 10 in accordance with the new IUPAC classification (CRC Handbook of Chemistry and Physics, publisher CRC Press, editor D R Lide, 81st edition, 2000-2001.

In the context of this patent application the term olefin corresponds to monoolefins and/or diolefins.

The invention concerns a process for purification by elimination of chlorine in the form of hydrogen chloride and organochlorine compounds by contacting in the presence of hydrogen of at least a part of the effluent from a reforming, aromatics production, dehydrogenation, isomerisation or hydrogenation zone, said part of the effluent comprising olefins, hydrogen chloride and organochlorine compounds, on an elimination zone comprising a chain arrangement of two masses, the first mass being a mass comprising at least one metal from group VIII deposited on a mineral carrier and the second mass being a hydrogen chloride adsorbent.

In accordance with a preferred variant at least a part of the effluent from the reforming zone circulates through a gas-liquid separator, said separator leading to a flow of gas rich in hydrogen (A) and a liquid effluent (B), said liquid effluent being passed to a stabilisation zone, said stabilisation zone leading to at least two cuts, a first light cut (C) and a first heavy cut (D), said first heavy cut being passed to a fractionating column leading to the production of at least two cuts, a second light cut (E1) taken off at the column head, optionally a cut (E2) taken off between the column head and the supply for the column, each of which cuts (E1) and (E2) can be passed to a benzene hydrogenation zone, and a second heavy cut (F). The purification zone is placed on any flow coming from the gas-liquid separator, the stabilisation column or the fractionating column.

In accordance with a preferred variant of the invention the purification zone is placed on the flow of gas which is rich in hydrogen (A), the liquid effluent (B) or at least one of the cuts (E1) or (E2).

In accordance with a variant hydrogen is added in the contacting operation on the elimination zone of at least a part of the effluent from a reforming, aromatics production, dehydrogenation, isomerisation or hydrogenation zone.

The two masses of the collection zone are generally either charged in the same reactor or in two different reactors. In the case where the two masses are charged in the same reactor the first mass is generally the catalytic mass and the second mass is generally the hydrogen chloride adsorbent.

In accordance with a variant the two masses are disposed in the same reactor and the first mass is generally disposed at the head of the collection zone. It then occupies a volume generally corresponding to 10 to 60% of the total volume of said zone.

In accordance with a variant when the second mass is saturated it is discharged separately while diverting the charge to be treated towards a third reactor comprising a hydrogen chloride adsorbent. That makes it possible to ensure continuity in the operation.

The metal from group VIII which is selected will preferably be palladium and/or platinum. Those metals are deposited on the carrier using methods which are known to the man skilled in the art, namely by impregnation with aqueous solutions of soluble palladium and platinum salts. For example, if the metal from group VIII is palladium, it can be introduced by procedures involving impregnation with an aqueous or organic solution of a palladium precursor. That precursor may be for example a mineral compound such as palladium chloride, palladium nitrate, tetramine palladium dihydroxide, tetramine palladium chloride or an organometallic compound such as for example palladium his z-allyl or palladium bis-acetylacetonate. The palladium is deposited preferably in a skin configuration, that is to say at the surface of the catalyst grains, for example balls or cylindrical extrudates, with penetration into the grains which is comprised in a peripheral layer not exceeding for example 80% of the radius of the balls or cylinders. The skin thickness is generally between 100 and 700 micrometres.

After introduction of the different elements the catalyst is generally dried at about 120° C. and then calcined at temperatures generally between 150 and 700° C.

The palladium or platinum content is generally between 0.1 and 1% by weight and preferably between 0.2 and 0.6% by weight.

The mineral carrier used can be selected from alumina, silica, silica alumina, silica magnesia, titanium oxide, aluminosilicates of zeolites type, all those solids being used alone or in a mixture with each other. Preferably alumina will be used.

The second mass can be selected from all those known for effectively adsorbing hydrogen chloride. They can be formed by one or more alkali metal or alkaline earth metal compounds deposited on an alumina of a specific surface area which is generally between 50 and 400 m$^2$/g.

They may also comprise mixed oxides, in particular based on copper and/or zinc.

The content of alkali metal or alkaline earth metal is generally between 0.5% and 70% by weight and preferably between 2% and 35% by weight with respect to the total weight of the composition.

Deposit of the alkali metal and alkaline earth metal elements can be effected by any method known to the man skilled in the art, for example by impregnation of the alumina with an aqueous solution of soluble alkali metal or alkaline earth metal salts. After impregnation the mass is dried and calcined in suitable fashion, the calcination temperature generally being between 300 and 900° C.

The second mass can be in any form permitting the highest level of accessibility and thus the greatest possible capacity for adsorption of hydrogen chloride. For example use will be made of balls or extrudates which can be of any shapes, for example in the form of trilobates. The mean diameter of the balls and extrudates will be the smallest possible, for example between 1 and 5 mm, while taking care not to cause excessively great pressure drops in the reactor.

The part of the effluent from the reforming zone which is treated generally contains between 0.1 and 50 ppm by weight of chlorinated compounds reckoned as chlorine. In general the elimination zone is operated in the presence of hydrogen, preferably with a molar ratio of hydrogen to chlorine of higher than 5, very preferably with a molar ratio of hydrogen to chlorine of between 5 and $10^6$, at a temperature of between 25 and 350° C., preferably between 35 and 200° C., preferably between 130 and 180° C., and at a pressure of between 0.2 and 5 MPa, preferably between 0.5 and 4 MPa, preferably between 1 and 3 MPa.

The space velocities of the gases to be purified, expressed as an hourly flow rate by volume TPN of the gas divided by the mass volume, GHSV, are generally between 50 and 2000 h$^{-1}$ and preferably between 100 and 1000 h$^{-1}$.

The space velocities of the liquids to be purified expressed as an hourly flow rate by volume of liquid divided by the mass volume (LHSV) are generally between 1 and 50 and preferably between 2 and 40 h$^{-1}$.

The hydrogen may be initially present in the hydrocarbon charge to be treated. In particular in liquid charges in dissolved form from 100 molar ppm. The hydrogen can also be added in the contacting operation in the elimination zone in respect of at least a part of the effluent from a reforming, aromatics production, dehydrogenation, isomerisation or hydrogenation zone.

FIG. 1 shows treatment of the effluent from the reforming zone.

At least a part of the effluent from the reforming zone circulates by way of the line 1 through a gas-liquid separator 10, the separator resulting in a flow of gas which is rich in hydrogen A flowing by way of the line 2, and a liquid effluent B flowing by way of the line 3, the liquid effluent being passed by way of the line 3 to a stabilisation zone 11, the stabilisation zone leading to at least two cuts, a first light cut C flowing by way of the line 4 and a first heavy cut D flowing by way of the line 5, the first heavy cut being passed by way of the line 5 to a fractionating column 12 leading to the production of at least two cuts, a second light cut E1 which is taken off at the column head and flows by way of the line 6, optionally a cut E2 which is taken off between the column head and the supply for the column and flows by way of the line 7, each of which cuts E1 and E2 can be passed to a benzene hydrogenation zone, and a second heavy cut F flowing by way of the line 8. The purification zone is placed on any flow from the gas-liquid separator 10, the stabilisation column 11 or the fractionating column 12.

EXAMPLE 1

Comparative

This procedure uses an alumina prepared in accordance with the preparation method described in patent application EP 1053053. It is in the form of balls measuring 2 to 5 mm and is of a specific surface area of 349 m$^2$/g. Sodium is firstly incorporated by what is referred to as dry impregnation of a solution of NaNO$_3$ so as to produce 6.7% by weight of sodium after drying at 100° C. and calcination at 820° C.

100 cm$^3$ of that mass A is placed in a cylindrical reactor and the reactor is supplied with a liquid effluent (high-severity reformate) coming from a gas-liquid separator of the reforming unit. That effluent is referred to as B in the description.

The characteristics of that high-severity reformate are as follows:

| | |
|---|---|
| ASTM distillation | initial point: 20° C. |
| | final point: 200° C. |
| Content of monoolefins: | 1.9% by weight |
| Content of diolefins: | 1000 ppm by weight |
| Content of H2: | 0.15% mole |
| Content of chlorine (ex HCl): | 6 ppm by weight (1) |
| Content of chlorine (ex organochlorines): | 2 ppm by weight (2) |

(1) analysis method: UOP 588
(2) analysis method: ASTM D 4929

That reformate is circulated at a flow rate of 2 litres per hour, which corresponds to a liquid space velocity of 20 h$^{-1}$. The reactor is operated at a temperature of 140° C. and under a pressure of 1 MPa.

That reactor is operated for a period of 1000 hours.

The contents of olefins and chlorine at the end of 200 hours and 1000 hours are measured.

The results obtained are summarised in the following table:

| Concentrations | After 200 hours | After 1000 hours |
|---|---|---|
| Chlorine ex HCl (ppm by weight) | 0 | 1 |
| Chlorine ex organochlorines (ppm by weight) | 2 | 7 |

It is noted that only the HCl is absorbed by the mass at the end of 200 hours. In contrast, at the end of 1000 hours, the appearance of a substantial concentration of organochlorines is noted, the HCl itself no longer being totally absorbed. That is explained by the fact that the mass is saturated by the HCl and that the latter, instead of being adsorbed, reacts with the olefins present to form organochlorine compounds.

EXAMPLE 2

According to the Invention

A mass B comprising 0.3% by weight of palladium deposited on alumina is prepared. The palladium is deposited by what is referred to as dry impregnation from Pd(NO$_3$)$_2$. The alumina is in the form of balls measuring 3 mm in mean diameter, it is of a specific surface area of 120 m$^2$/g. After impregnation the mass is dried at 120° C. and then calcined at 450° C. The result obtained is a deposit of palladium which remains in skin form on the ball. The thickness of that skin is 300 microns.

A second mass C is prepared using the preparation method described in patent application EP 1053053 comprising 6.7% of Na after impregnation of NaNO$_3$ and calcination at 820° C. of an alumina equivalent to that described in Example 1.

100 cm$^3$ of each of those masses is placed in a cylindrical reactor, the first at the head, the second at the bottom, the two being separated by a metal grid.

Operation is implemented with the same liquid charge and under the same conditions as those in Example 1. That reactor is operated for a period of 1000 hours and the contents of olefins and chlorine are measured at the end of 200 hours, 800 hours and 1000 hours.

The results obtained are summarised in the following Table:

| Concentrations | After 200 hours | After 800 hours | After 1000 hours |
|---|---|---|---|
| Chlorine ex HCl (ppm by weight) | 0 | 1 | 8 |
| Chlorine ex organochlorines (ppm by weight) | 0 | 0 | 0 |

It is observed that all the organochlorines are transformed. The first trace of HCl however appears at the end of 800 hours, which announces approaching saturation of the HCl collection mass.

EXAMPLE 3

According to the Invention

This Example involves treating the light cut (referred to as the light reformate and containing the major part of the benzene) issuing from the fractionating column prior to being passed to a benzene hydrogenation zone. That cut is referred to as E1 in the description.

The characteristics of that cut are as follows:

| | |
|---|---|
| ASTM distillation | initial point: 35° C. |
| | final point: 75° C. |
| Content of monoolefins: | 1.0% by weight |
| Content of diolefins: | 1000 ppm by weight |
| Content of chlorine (ex HCl): | 2 ppm by weight (1) |
| Content of chlorine (ex organochlorines): | 1.5 ppm by weight (2) |

100 cm$^3$ of the palladium catalytic mass B as described in Example 2 is disposed in a first reactor.

100 cm³ of the HCl collection mass C of Example 2 is charged in a second reactor.

A flow rate of 1 litre per hour of the charge to be treated is passed over those two reactors disposed in series, under the following conditions:
Temperature: 140° C.
Pressure: 2.5 MPa
$H_2$ flow rate: 240 litres TPN/hour (that is to say about 1 mole $H_2$/mole of charge).

The two reactors are operated for a period of 1000 hours and the contents of olefins and chlorine at the end of 500 and 1000 hours are measured.

The results obtained are summarised in the following table:

| Concentrations | After 500 hours | After 1000 hours |
|---|---|---|
| Olefins (% by weight) | 0.1 | 0.1 |
| Chlorine ex HCl (ppm by weight) | 0 | 0 |
| Chlorine ex organochlorines (ppm by weight) | 0 | 0 |

It is noted that all the chlorine compounds are totally eliminated.

EXAMPLE 4

According to the Invention

This time the gaseous effluent rich in hydrogen (referred to as A in the description) from the separator of the reforming unit is treated, the composition thereof being as follows:

| Composition | % mole |
|---|---|
| $H_2$ | 92 |
| $C_1$ | 1 |
| $C_2$ | 1.2 |
| $C_{3+}$ | 1.3 |
| $C_{4+}$ | 4.5 |
| Olefins | 0.1 |

Analysis of the chlorine compounds:

| HCl | 3 ppm vol |
|---|---|
| Organochlorines | 0 |

This Example 4 involves comparing the behaviour of the mass A with that of the combination of masses B and C.

One case involves using the reactor which is charged as in Example 1 while the other case involves using the arrangement of Example 2.

Operation is implemented under the following conditions:
Pressure: 1.5 MPa
T° C.: 40° C.
Gaseous flow rate: 80 litres/h (GHSV=800 h⁻¹)

The results obtained after 200 hours and 1000 hours are summarised in the following table:

| Concentrations | After 200 hours Arrangement | | After 1000 hours Arrangement | |
|---|---|---|---|---|
| Masses | A | B + C | A | B + C |
| Olefins (ppm vol) | 500 | <10 | 500 | <10 |
| Chlorine ex HCl (ppm vol) | 0 | 0 | 0.5 | 0.3 |
| Chlorine ex organochlorines (ppm vol) | 0 | 0 | 2.5 | 0 |

It is observed that the mass A of Example 1, at the end of 1000 hours, causes disappearance of the HCl not by adsorption but by addition to the olefins present. In contrast, the arrangement of Example 2 with the masses B and C continues to eliminate the HCl virtually totally, avoiding the formation of organochlorines by virtue of virtually complete hydrogenation of the olefins present.

The invention claimed is:

1. A process for purification of at least a part of an effluent from a reforming zone said effluent comprising olefins, hydrogen chloride and organochlorine compounds by elimination of chlorine in the form of hydrogen chloride and organochlorine compounds, said process comprising contacting in the presence of hydrogen a part of the effluent in an elimination zone comprising a serial arrangement of two masses, the first mass being a mass comprising palladium impregnated on a mineral carrier and the second mass being a hydrogen chloride adsorbent, wherein said mineral carrier of said first mass consists of balls or cylindrical extrudates which consist of alumina and said palladium is present on said carrier at essentially only in a skin thickness of generally between 100 and 700 microns representing not more than 80% of the radius of said beads or extrudates.

2. A process for purification by elimination of chlorine according to claim 1 wherein at least a part of the effluent from the reforming zone circulates through a gas-liquid separator, said separator leading to a flow of gas rich in hydrogen (A) and a liquid effluent (B), said liquid effluent being passed to a stabilisation zone, said stabilisation zone providing at least two cuts, a first light cut (C) and a first heavy cut (D), said first heavy cut being passed to a fractionating column leading to the production of at least two cuts, a second light cut (E1) taken off at the column head, which cut (E1) can be passed to a benzene hydrogenation zone, and a second heavy cut (F), a purification zone integrated with any flow coming from the gas-liquid separator, a stabilisation column or the fractionating column.

3. A process for purification by elimination of chlorine according to claim 2 wherein said fractionating column leads to the production of at least three cuts, a second light cut (E1) taken off at the column head, a cut (E2) taken off between the column head and the supply of the column, each of which cuts (E1) and (E2) can be passed to a benzene hydrogenation zone, and a second heavy cut (F).

4. A process for purification by elimination of chlorine according to claim 3 wherein the purification zone is integrated with the flow of gas which is rich in hydrogen (A), the liquid effluent (B) or at least one of the cuts (E1) or (E2).

5. A process for purification by elimination of chlorine according to claim 1 wherein the elimination zone is operated in the presence of hydrogen with a molar ratio of hydrogen to chlorine of higher than 5, at a temperature of between 25 and 350° C. and at a pressure of between 0.2 and 5 MPa.

6. A process for purification by elimination of chlorine according to claim 1 wherein the two masses of the elimination zone are either charged in the same reactor or in two different reactors.

7. A process for purification by elimination of chlorine according to claim 1 wherein when the second mass is saturated, said second mass is discharged separately while diverting the effluent from the reforming zone towards a third reactor comprising a hydrogen chloride adsorbent.

8. A process for purification by elimination of chlorine according to claim 1 wherein the hydrogen chloride adsorbent is an alumina promoted with an alkali metal or an alkaline earth metal.

9. A process according to claim 1, wherein the mineral carrier comprises alumina balls having a diameter of about 3 mm and a skin thickness of palladium at about 300 microns.

10. A process according to claim 1 wherein said skin thickness is on the order of about 10% of the diameter of the beads or extrudates.

11. A process according to claim 1 wherein said mineral carrier is impregnated with an aqueous or organic solution of a palladium precursor.

12. A process according to claim 11 wherein the precursor is palladium nitrate.

13. A process according to claim 12, wherein the mineral carrier comprises alumina balls having a diameter of about 3 mm and a skin thickness of palladium at about 300 microns.

\* \* \* \* \*